(12) United States Patent
Siraky et al.

(10) Patent No.: US 7,638,960 B2
(45) Date of Patent: Dec. 29, 2009

(54) POSITIONING DEVICE

(75) Inventors: Josef Siraky, Donaueschingen (DE); Rolf Hartlieb, Villingen-Schwenningen (DE); Josef Maier, Opferdingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 28 days.

(21) Appl. No.: 11/633,080

(22) Filed: Dec. 4, 2006

(65) Prior Publication Data

US 2007/0126389 A1 Jun. 7, 2007

(30) Foreign Application Priority Data

Dec. 5, 2005 (DE) .................. 10 2005 058 178

(51) Int. Cl.
*H02P 6/00* (2006.01)
(52) U.S. Cl. .................. 318/400.16; 318/127; 318/652; 318/721; 400/279
(58) Field of Classification Search ................. 318/652, 318/560, 489, 602, 127, 721, 265; 310/68 B, 310/323.17, 156.05, 98, 109; 400/139, 279, 400/315, 636.1
See application file for complete search history.

(56) References Cited

U.S. PATENT DOCUMENTS

| | | | | |
|---|---|---|---|---|
| 3,566,475 A * | 3/1971 | Seccombe | .................... | 33/1 M |
| 3,938,191 A * | 2/1976 | Jarmy | ........................ | 358/491 |
| 5,241,525 A * | 8/1993 | Taylor | ........................ | 369/70 |
| 5,444,525 A * | 8/1995 | Takahashi et al. | ............. | 399/76 |
| 5,678,144 A * | 10/1997 | Osaki et al. | .................. | 399/167 |
| 5,717,512 A * | 2/1998 | Chmielewski et al. | ...... | 359/210 |
| 5,754,932 A * | 5/1998 | Tahara | ........................ | 399/303 |
| 5,764,014 A * | 6/1998 | Jakeway et al. | ................ | 318/587 |
| 5,839,046 A * | 11/1998 | Takano et al. | ................ | 399/384 |
| 6,112,655 A * | 9/2000 | Suzuki et al. | ............... | 101/118 |
| 6,133,932 A * | 10/2000 | Webb et al. | .................. | 347/232 |
| 6,141,525 A * | 10/2000 | Tahara | ........................ | 399/395 |
| 6,420,807 B1 * | 7/2002 | Tsujimoto et al. | ............. | 310/83 |
| 6,474,922 B2 * | 11/2002 | Bachman et al. | .............. | 414/21 |
| 6,507,713 B2 * | 1/2003 | Koide | .......................... | 399/51 |
| 6,511,141 B1 * | 1/2003 | Hasegawa et al. | .............. | 347/3 |
| 6,520,701 B2 * | 2/2003 | Kaya | .......................... | 400/621 |
| 6,587,220 B1 * | 7/2003 | Sato et al. | .................. | 358/1.16 |
| 6,778,204 B2 * | 8/2004 | Morita | ........................ | 347/248 |
| 6,793,303 B2 * | 9/2004 | Ikeda | ............................ | 347/4 |
| 6,817,692 B2 * | 11/2004 | Nakazawa et al. | ............. | 347/12 |
| 6,860,204 B2 * | 3/2005 | Hashiguchi | .................. | 101/486 |
| 2005/0099153 A1 * | 5/2005 | Komatsu et al. | ............. | 318/807 |
| 2006/0061489 A1 * | 3/2006 | Ellis et al. | ...................... | 341/13 |

* cited by examiner

*Primary Examiner*—Bentsu Ro
*Assistant Examiner*—Antony M Paul
(74) *Attorney, Agent, or Firm*—The Nath Law Group; Jerald L. Meyer; Sung Yeop Chung

(57) ABSTRACT

A positioning device for positioning a positioning element has a motor (18) that drives the positioning element (10) and has a measuring device that directly measures the positioning travel of the positioning element for controlling the motor (18). For this, a traction cable (32) is joined to the positioning element and is wound onto a drum (36). For measuring the positioning travel of the positioning element, the rotational position of the drum (36) is measured by means of an encoder (42).

8 Claims, 5 Drawing Sheets

POSITIONING DEVICE

The invention relates to a positioning device in accordance with the preamble to claim 1.

Such positioning devices precisely position a positioning element on a linear or rotary positioning path. The positioning device has a motor that drives a positioning member, e.g. an output shaft, that itself influences the position of the positioning element via a mechanical link. A measuring device measures an actual position that is used to control the motor for positioning the positioning element.

Known for measuring the actual position is the use of an encoder that is coupled to the shaft of the motor or to the output shaft of the positioning device. The encoder can measure the rotation of the motor shaft or output shaft incrementally or absolutely. The rotational movement of the motor shaft or output shaft must be converted via a mechanical link, e.g. spindles, gears, or the like, into linear or rotary movement of the positioning element. Since such spindles and gears have some play, mechanical tolerances, and the like, the actual position of the positioning element does not precisely correspond to the measured actual position of the motor shaft or output shaft. Improving positioning precision is only possible by reducing those tolerances, which is associated with great mechanical complexity.

U.S. Pat. No. 5,053,685 describes one such known positioning device. In this case, the motor drives a nut that linearly moves the spindle as the positioning member. The linear position of this positioning member is linearly scanned within the positioning device and is used as the actual position signal for controlling the motor. Tolerances and errors in transmitting the movement of the positioning member to the positioning element to be positioned cannot be detected.

Known from U.S. Pat. No. 4,121,504 is a positioning device having a linearly hydraulically displaceable piston, the actual position of which is determined by a measuring device that has a traction cable that is attached to the piston and that is wound onto a drum. An encoder coupled to the shaft of the drum measures the angular position of the drum and thus the winding length of the traction cable. In this case, as well, the actual position of the piston acting as positioning member is detected. Defects in the mechanical link between this positioning member and the positioning element actuated by this positioning member cannot be detected.

The underlying object of the invention is to create a positioning device for a movable positioning element that makes possible high positioning accuracy for the positioning element with low mechanical complexity and that has the requisite flexibility for different applications.

This object is inventively attained using a positioning device with the features of claim 1.

The subordinate claims provide advantageous embodiments of the invention.

In the inventive positioning device, it is not a position of the positioning device that is measured as the actual position for controlling the motor, but rather the actual position of the positioning element to be actuated by the positioning device. A measuring device is used for this that is independent of the motor and of the positioning member that can be driven by the motor, and it [this measuring device] has a traction cable that can be wound on a drum, the rotational position of the drum being detected by means of an encoder. The free end of the traction cable leads out of the positioning device and is joined directly to the positioning element to be positioned. This has two essential advantages in particular. The measurement of the position of the positioning element itself as the actual value for controlling the motor renders the precision of the positioning of the positioning element regardless of defects and tolerances in the mechanical link between the positioning member of the positioning device, which member is driven by the motor, and the positioning element to be positioned. Therefore it is not required that any high precision requirements be placed on this mechanical link, e.g. in the form of gears, spindles, or the like, so that this mechanical link can be developed in a cost-effective manner. Moreover, the positioning device has great flexibility in terms of how it can be used for very different applications. The motor, motor control, and measuring device can form a compact, universally employable positioning device. This positioning device has the positioning member driven by the motor and the traction cable of the measuring device as a mechanical interface to the positioning element to be positioned. The mechanical link can be fitted between the driven positioning member and the positioning element depending on the geometrical configuration in the application, and the design of the positioning element to be positioned. Since the traction cable is flexible and can be reversed as desired, the measuring device does not limit the arrangement and installation of the positioning device or the mechanical link between the positioning device and the positioning element to be positioned. In one advantageous application, the motor and its shaft are arranged with axes parallel to a spindle driving the positioning element. The housing of the positioning device with the motor and the measuring device can be constructed on the side of and with its axis parallel to a positioning housing that accommodates the spindle and the positioning element. The traction cable joined to the positioning element is then conducted in the positioning housing parallel to the spindle, emerges from the end of the positioning housing, is reversed 180°, and enters parallel into the housing of the positioning device, in which housing it runs onto the drum coupled to the encoder. In this manner the entire arrangement forms a compact closed module whose longitudinal dimension is largely determined solely by the length of the travel of the positioning element.

In the following the invention is explained in greater detail using an exemplary embodiment depicted in the drawings.

Figure 1:
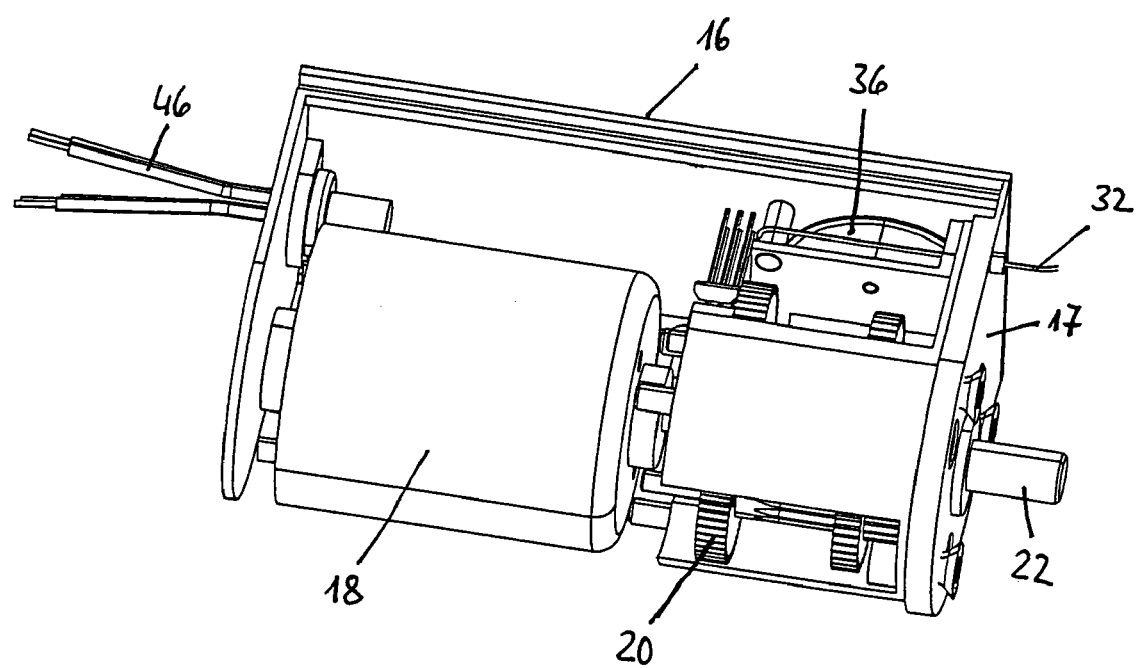
FIG. 1 is a perspective view of the positioning device with a partially open housing.
Figure 2:
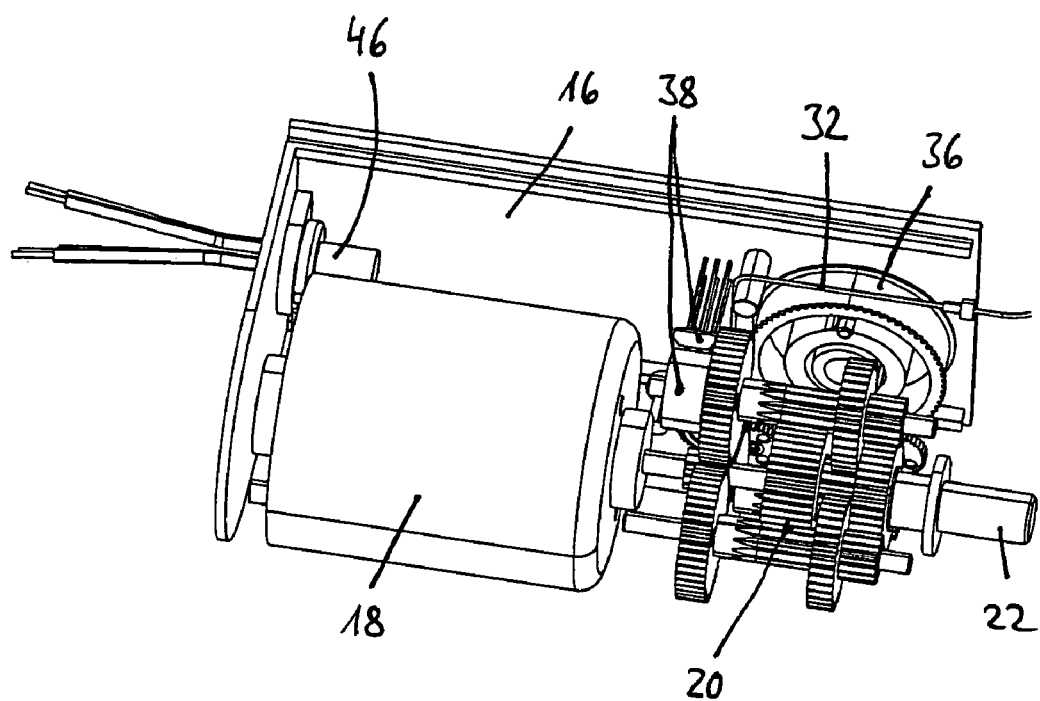
FIG. 2 depicts the positioning device with additional housing parts removed.
Figure 3:
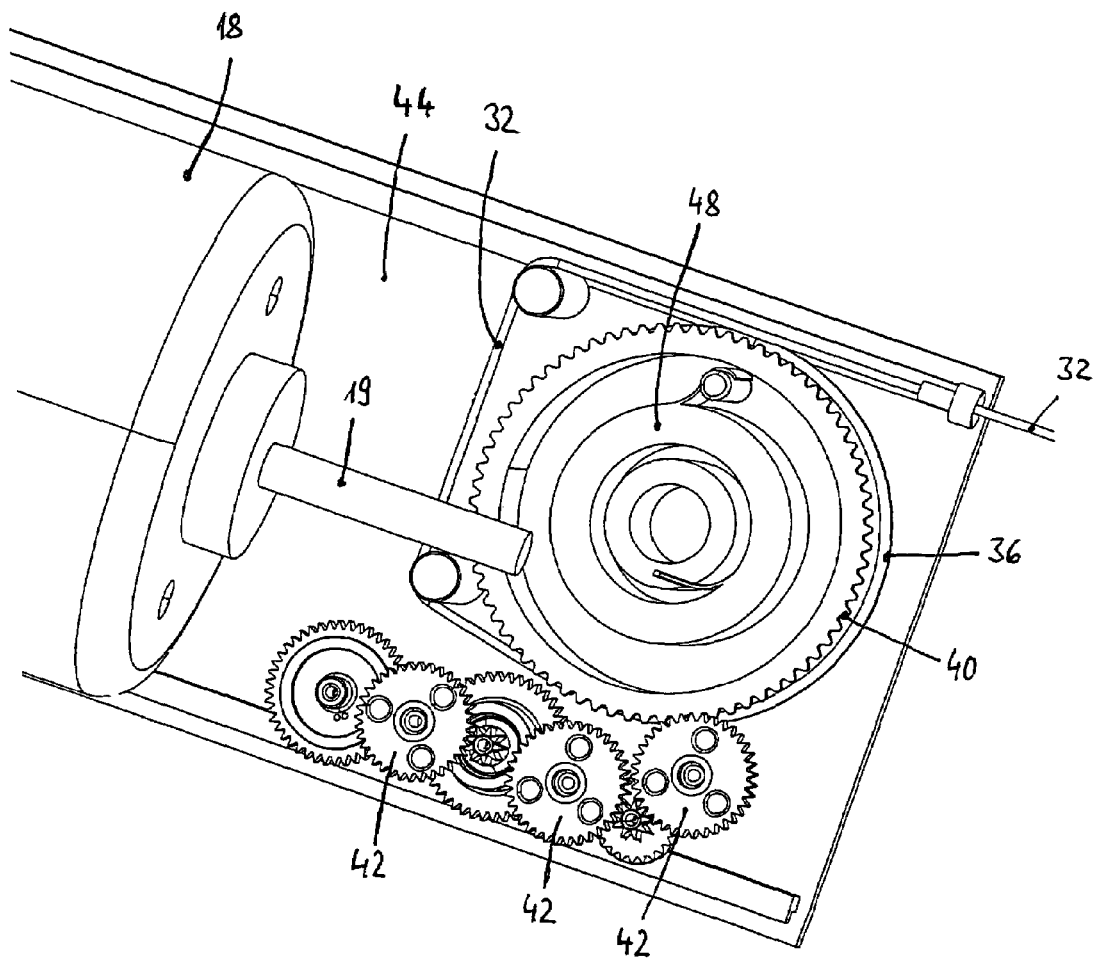
FIG. 3 depicts a partial view of the measuring device of the positioning device.

FIGS. 1 through 3 depict the positioning device that forms a compact module enclosed in a housing 16. A lateral cover for the housing 16 has been removed in FIG. 1. In FIG. 2, this lateral cover and an end face 17 of the housing 16 have been removed to make it possible to view the interior structure of the positioning device.

In the housing 16, an electrical motor 18 is arranged such that its shaft 19 runs in the longitudinal direction of the housing 16. The motor 18 drives a toothed wheel gear reduction drive system 20, the output shaft 22 of which, as the positioning member, projects with its axis parallel to the shaft 19 of the motor out of the end face 17 of the housing 16.

Furthermore, arranged in the housing 16 between the end of the motor 18 and the end face 17 of the housing 16 is a drum 36 that is rotatably borne about an axis that is perpendicular to the lateral surface of the housing 16 and to the axis of the motor 18. The drum 36 is located between the toothed wheel gearing 20 and the side wall of the housing 16. Wound onto the drum 36 is one end of a traction cable 32 that is led out of the housing 16 through the end face 17 adjacent to the output shaft 22. Situated coaxially in the drum 36 is a mainspring 48 that pre-stresses the drum 36 in the winding direction of the traction cable 32 and thus holds the traction cable 32 under tension.

As can be seen most clearly in FIG. 3, in which the toothed wheel gearing 20 is omitted, the drum 36 has on one circumferential edge external teeth 40 that are engaged with an encoder 42. The encoder 42 is embodied as a multiturn encoder, i.e. the encoder 42 precisely measures the exact angular position of the drum 36 over a plurality of revolutions. Such a multiturn encoder belongs to the prior art. The steps of the encoder 42, which are switched one after the other via reducing teeth, can be seen clearly in FIG. 3.

The encoder 42 and its electronic wiring are arranged on a printed circuit board 42 [sic] that is mounted in the housing 16 parallel to and positioned against its side wall. The printed circuit board 44 also carries the electronics for controlling the motor 18 and a sensor 38 that commutates the motor 18. Power for the motor 18 of the electronics is fed via cable 46 through the end of the housing 16 that opposes the end face 17.

The positioning device can be used for positioning any desired positioning element. Using a mechanical link adapted to the application, the rotation of the output shaft 22 is converted to a linear or rotary movement of the positioning element. The free end of the traction cable 32 that is led out of the housing 16 is joined to this positioning element, it being possible to reverse the traction cable 32 depending on the configuration of the positioning device and the positioning element. The traction cable 32 follows the movement of the positioning element 10 with no play. This movement is converted, with no play, by the traction cable 32 to the rotational movement of the drum 36, since the traction cable 32 is kept under tension by the mainspring 48. The encoder 42 thus measures the precise actual position of the positioning element 10. The motor 18 is controlled according to this actual position that is measured by the encoder 42, so that precise positioning of the positioning element is possible using the motor 18, the toothed wheel gearing 20, the output shaft 22, and the mechanical link, without mechanical play or other defects in this drive chain from the motor 18 to the positioning element affecting the position regulation and thus the precision of the positioning of the positioning element.

Figure 4:
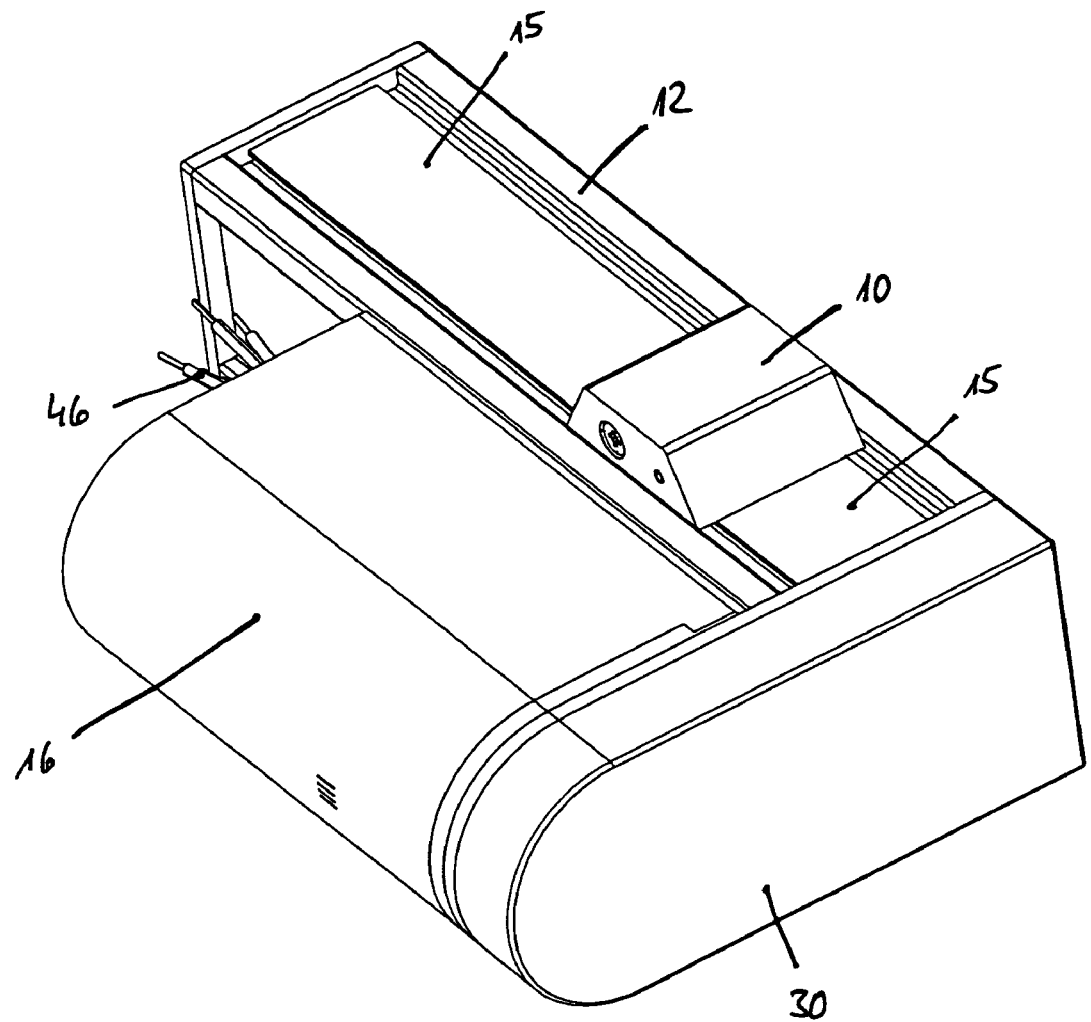
FIG. 4 depicts one exemplary application of the positioning device.
Figure 5:
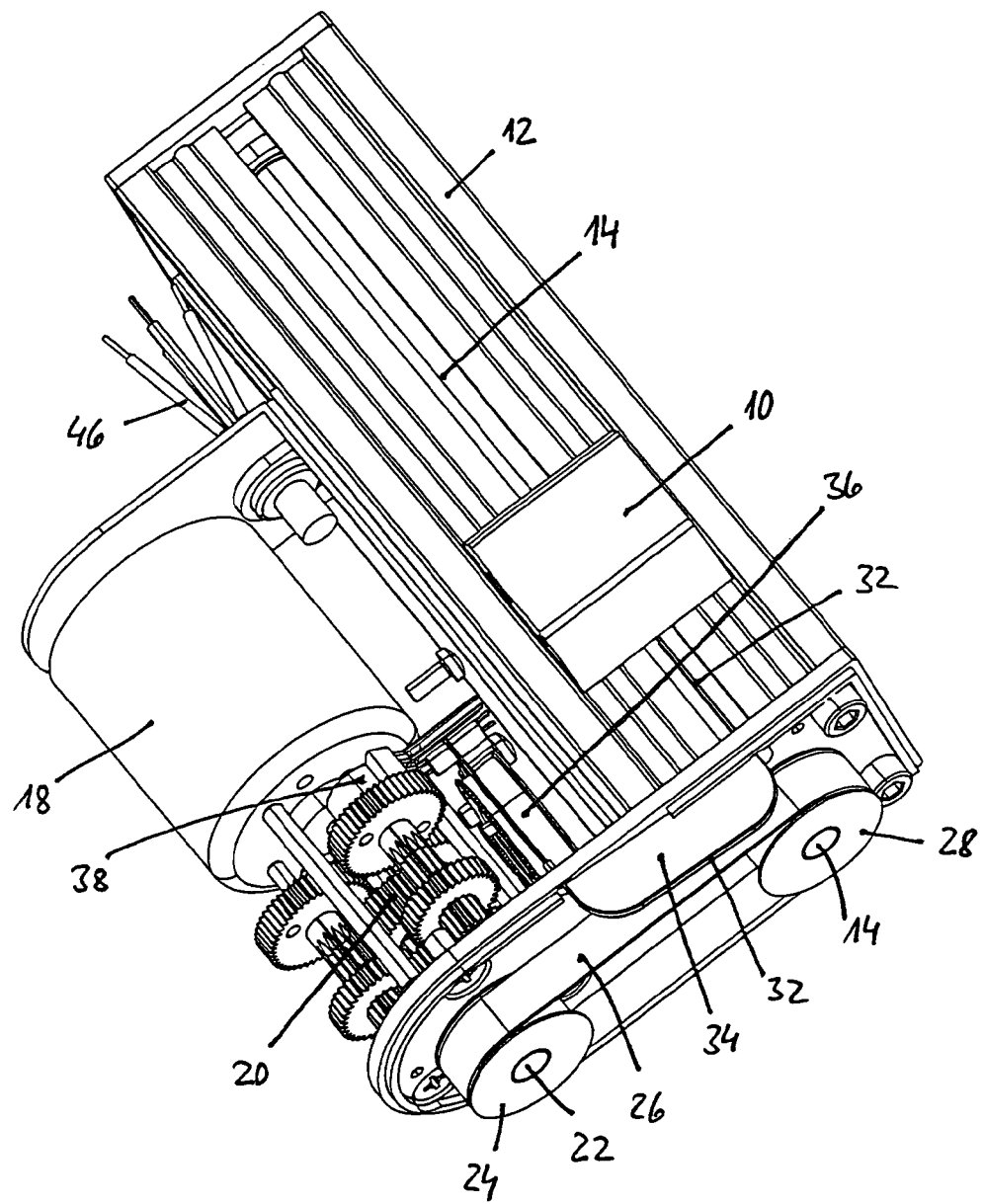
FIG. 5 depicts the exemplary application in FIG. 4 with the housing open.

FIGS. 4 and 5 depict one exemplary application for the positioning device in FIGS. 1 through 3. FIG. 4 depicts the design in its closed form, while in FIG. 5, housing parts have been removed in order to render the structure visible.

The positioning device actuates a positioning element 10 that fulfills a desired function for the invention. The positioning element 10 is guided, linearly movable, in a positioning housing 12 that has the shape of a longitudinally extended rectangular parallelepiped and is formed e.g. by an aluminum profile. Axially rotably borne in the positioning housing 12 is a spindle 14 on which the positioning element 10 is movable by means of a spindle nut. A cover strip 15 covers and seals the positioning housing 12 in the area of the path of the positioning element 10.

The housing 16 of the positioning device is built onto one longitudinal side wall of the positioning housing 12. One end face of the positioning housing 12 is arranged flush with the end face 17 of the housing 16.

Seated on the end of the output shaft 22 that as the positioning member projects via the end face 17 from the housing 16 is a toothed belt pulley 24 that, via a continuous toothed belt 26, drives a toothed belt pulley 28 that is seated torqueproof on the end of the spindle 14 that is led out of the end of the positioning housing 12. Via the toothed wheel gearing 20 and the toothed belt 26 the motor 18 thus rotationally drives the spindle 14 thereby linearly displacing the positioning element 10 seated with a nut on the spindle 14. An end cap 30 covers the belt pulleys 24 and 28 and the toothed belt 26 and closes the ends of the positioning housing 12 and the housing 16.

The free end of the traction cable 32 is attached to the positioning element 10 in the positioning housing 12. The traction cable 32 runs parallel to the spindle 14 in the positioning housing 12 and emerges from the positioning housing 12 at its end above the belt pulley 28. Attached to the ends of the positioning housing 12 and the housing 16 is a guide shoe 34 that has a guide groove on its exterior edge. The traction cable 32 emerging from the positioning housing 12 runs in this guide nut of the guide shoe 34 and is reversed by the guide shoe 34 so that the traction cable 32 reverses a total of 180° and enters into the end face 17 of the housing 16 with its axis parallel to the spindle 14 and the output shaft 22. The end cap 30 also covers the guide shoe 34 and the traction cable 32 running thereupon.

LEGEND

10 Positioning element
12 Positioning housing
14 Spindle
15 Cover strip
16 Housing
17 End face
18 Motor
19 Shaft
20 Toothed wheel gearing
22 Output shaft
24 Belt pulley
26 Toothed belt
28 Belt pulley
30 End cap
32 Traction cable
34 Guide shoe
36 Drum
38 Sensor
40 External teeth
42 Encoder
44 Printed circuit board
46 Cable
48 Mainspring

The invention claimed is:

1. Positioning device having a motor (18), having a positioning member (22), which can be driven by said motor (18) and through which a positioning element (10) can be positioned, and having a measuring device for determining an actual position of said positioning element (10) for controlling said motor (18), characterized in that said measuring device is independent of the positioning element (10) and joined to the positioning element (10) by a traction cable (32), wherein said measuring device comprises said traction cable (32), a drum (36) onto which one end of said traction cable (32) can be wound, and an encoder (42) coupled to said drum (36), and wherein the other end of said traction cable (32) is led out of said positioning device and is joinable with said positioning element (10).

2. Positioning device in accordance with claim 1, characterized by said encoder (42) being a multiturn encoder.

3. Positioning device in accordance with claim 1, characterized by said motor (18), a gearing (20) of said motor, and the measuring device being accommodated in a common housing (16).

4. Positioning device in accordance with claim 3, characterized by said encoder (42) and the electronics for controlling said motor (18) being arranged on a common printed circuit board (44) in said housing (16).

5. Positioning device in accordance with claim 1, characterized by said motor (18) driving a spindle (14) via a gearing (20, 24, 26, 28) on which said positioning element (10) moves.

6. Positioning device in accordance with claim 5, characterized by said motor (18) being arranged with shaft (19) parallel to said spindle (14).

7. Positioning device having a motor (18), having a positioning member (22), which can be driven by said motor (18) and through which a positioning element (10) can be positioned, and having a measuring device for determining an actual position of said positioning element (10) for controlling said motor (18), characterized in that said measuring device is independent of the positioning element (10) and joined to the positioning element (10) by a traction cable (32), wherein said measuring device comprises said traction cable (32), a drum (36) onto which one end of said traction cable (32) can be wound, and an encoder (42) coupled to said drum (36), and wherein the other end of said traction cable (32) is led out of said positioning device and is joinable with said positioning element (10), characterized by said motor (18), a gearing (20) of said motor, and the measuring device being accommodated in a common housing (16), characterized by said housing (16) accommodating said motor (18) and said measuring device being built, with its axis parallel, at a side wall of a positioning housing (12) that accommodates said spindle (14) and said positioning element (10).

8. Positioning device in accordance with claim 7, characterized by said traction cable (32) running in said positioning housing (12) parallel to said spindle (14), emerging on the end of said positioning housing (12), being reversed by 180°, and entering the end of said housing (16).

* * * * *